US012663060B2

(12) United States Patent

Freemantle et al.

(10) Patent No.: US 12,663,060 B2

(45) Date of Patent: Jun. 23, 2026

(54) SHUTTLING MECHANICAL TENSIONER FOR CONTROL OF CHAIN DRIVES WITH ALTERNATING TIGHT AND SLACK STRANDS

(71) Applicant: BorgWarner, Inc., Auburn Hills, MI (US)

(72) Inventors: Paul Freemantle, Lansing, NY (US); Timothy K. White, Sterling Heights, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 18/939,025

(22) Filed: Nov. 6, 2024

(65) Prior Publication Data

US 2026/0126098 A1 May 7, 2026

(51) Int. Cl.
*F16H 7/08* (2006.01)

(52) U.S. Cl.
CPC ... *F16H 7/0848* (2013.01); *F16H 2007/0806* (2013.01); *F16H 2007/0842* (2013.01); *F16H 2007/0872* (2013.01); *F16H 2007/0891* (2013.01); *F16H 2007/0895* (2013.01); *F16H 2007/0897* (2013.01)

(58) Field of Classification Search
CPC .......... F16H 7/0848; F16H 2007/0842; F16H 2007/0806; F16H 7/0836; F16H 2007/0872
USPC ........................................................ 474/111
See application file for complete search history.

(56) References Cited

U.S. PATENT DOCUMENTS

| | | | | | |
|---|---|---|---|---|---|
| 2,723,566 | A | * | 11/1955 | Hyman | F16H 7/08 474/111 |
| 2,963,918 | A | * | 12/1960 | Nigel | F16H 7/0836 267/128 |
| 4,337,055 | A | * | 6/1982 | Mackay | F16H 7/08 474/140 |
| 7,641,576 | B2 | * | 1/2010 | Redaelli | F16H 7/08 474/110 |
| 10,781,893 | B2 | * | 9/2020 | Monsy | F16H 7/08 |
| 2002/0165056 | A1 | * | 11/2002 | Ullein | F16H 7/08 474/140 |
| 2006/0270500 | A1 | | 11/2006 | Yamamoto et al. | |
| 2007/0021251 | A1 | * | 1/2007 | Redaelli | F16H 7/08 474/111 |
| 2009/0205206 | A1 | | 8/2009 | Markley | |
| 2011/0081997 | A1 | | 4/2011 | Markely | |
| 2011/0237371 | A1 | * | 9/2011 | Neary | F16H 7/08 474/111 |
| 2012/0040790 | A1 | | 2/2012 | Perissinotto et al. | |
| 2013/0203534 | A1 | | 8/2013 | Schmid et al. | |
| 2013/0303318 | A1 | | 11/2013 | Hofmann et al. | |

(Continued)

FOREIGN PATENT DOCUMENTS

| | | |
|---|---|---|
| DE | 4428556 A1 | 2/1996 |
| JP | 2004044749 A | 2/2004 |
| JP | 2006125476 A | 5/2006 |

*Primary Examiner* — Victoria P Augustine
*Assistant Examiner* — Mark K Buse
(74) *Attorney, Agent, or Firm* — Brown & Michaels, PC

(57) ABSTRACT

A shuttling mechanical tensioner for control of chain drives with alternating tight and slack chain strands. The shuttling mechanical tensioner allows for chain control on an outside face of the chain strand or an inside face of the chain strand.

10 Claims, 15 Drawing Sheets

(56)                        References Cited

U.S. PATENT DOCUMENTS

2015/0345596  A1 *  12/2015  Lindner .................. F01L 1/022
                                                        474/111
2017/0370447  A1      12/2017  Freemantle et al.

* cited by examiner

SHUTTLING MECHANICAL TENSIONER FOR CONTROL OF CHAIN DRIVES WITH ALTERNATING TIGHT AND SLACK STRANDS

BACKGROUND

The present invention relates to mechanical tensioners, and more specifically to shuttling mechanical tensioners for control of chain drives with alternating tight and slack strands.

Tensioning devices, such as hydraulic tensioners, are used as a control device for automotive timing drives and power transmissions drives. Automotive timing drives and power transmission drives include either a chain or belt which travels between a plurality of sprockets or pulleys. In an automotive application, the tension of the chain can vary greatly on the slack side of the chain as the chain travels between the sprockets. Likewise, the tension of the chain can further vary as the chain elongates due to wear. As a result, it is important to impart and maintain a certain degree of tension to the chain to maintain control over the chain as it travels between the sprockets. As the chain elongates due to wear, it is important to provide an adjustable tensioning member to maintain the proper chain tension and system control.

SUMMARY

According to one embodiment of the present invention, a tensioner for a chain housed in a chain drive housing is disclosed. The tensioner comprising: a rod having a first end and a second end separated by a length and a series of grooves proximate to the second end; a first face support proximal to and fixed to a first end of the rod comprising a body defining a first face support hole for receiving the rod and a first face support protrusion extending axially from the body of the first face support, perpendicular to the first face support hole; a first tensioner face pivotably mounted to the first face support protrusion applying tension to a first strand of the chain; a second face support proximal to the second end of the rod having a body defining a second face support hole for receiving the rod, a cutout on a planar surface of the body adjacent the second face support hole, and a second face support protrusion extending axially from the body of the second face support, the cutout being adjacent to the series of grooves on the rod, wherein the second face support is moveable along the rod; a second tensioner face pivotably mounted to the second face support protrusion applying tension to the second strand of the chain; a clip for engaging the series of grooves of the rod within the second face support hole and the cutout of the second face support, allowing for movement of the rod in a first direction and preventing movement of the rod in a second direction, opposite the first direction; and a bias spring biasing the second face support towards the first face support. As slack in the chain increases, tension is applied to a first strand of the chain via the first tensioner face mounted to the first face support and tension is applied to the second strand of the chain by the second tensioner face mounted to the second face support moveably biased into contact by the bias spring and held in contact with second strand of the chain by engagement of the clip with the series of grooves on the rod and the cutout of the body of the second face support.

According to another embodiment of the present invention, a tensioner for a chain housed in a chain drive housing is disclosed. The tensioner comprising: a rod having a first end and a second end separated by a length and a series of grooves proximate to the second end; a first fixed piece mounted to the first end of the rod; a second fixed piece mounted to the second end of the rod; a first face support proximal to the first end of the rod and movable about the rod comprising a body defining a first face support hole for receiving the rod and a first face support protrusion extending axially from the body of the first face support, perpendicular to the first face support hole; a first tensioner face pivotably mounted to the first face support protrusion applying tension to a first strand of the chain; a second face support proximal to the second end of the rod having a body defining a second face support hole for receiving the rod, a cutout on a planar surface of the body adjacent the second face support hole, and a second face support protrusion extending axially from the body of the second face support, the cutout being adjacent to the series of grooves on the rod, wherein the second face support is moveable along the rod; a second tensioner face pivotably mounted to the second face support protrusion applying tension to the second strand of the chain; a clip for engaging the series of grooves of the rod within the second face support hole and the cutout of the second face support, allowing for movement of the rod in a first direction and preventing movement of the rod in a second direction, opposite the first direction; and a bias spring between the first moveable face support and the second moveable face support. As slack in the chain increases, tension is applied to the first strand of the chain via the first tensioner face mounted to the first face support biased into contact by the bias spring and tension is applied to the second strand of the chain by the second tensioner face mounted to the second face support moveably biased into contact by the bias spring and held in contact with second strand of the chain by engagement of the clip with the series of grooves on the rod and the cutout of the body of the second face support.

BRIEF DESCRIPTION OF THE DRAWINGS

FIG. 4b shows a sectional view of the rod of the shuttling tensioner of FIG. 4a.

FIG. 5b shows a sectional view of FIG. 5a.

FIG. 6b shows a sectional view of FIG. 6a.

FIG. 12 shows an alternate sectional view with a solid rod of FIG. 5a.

DETAILED DESCRIPTION

Figure 1:
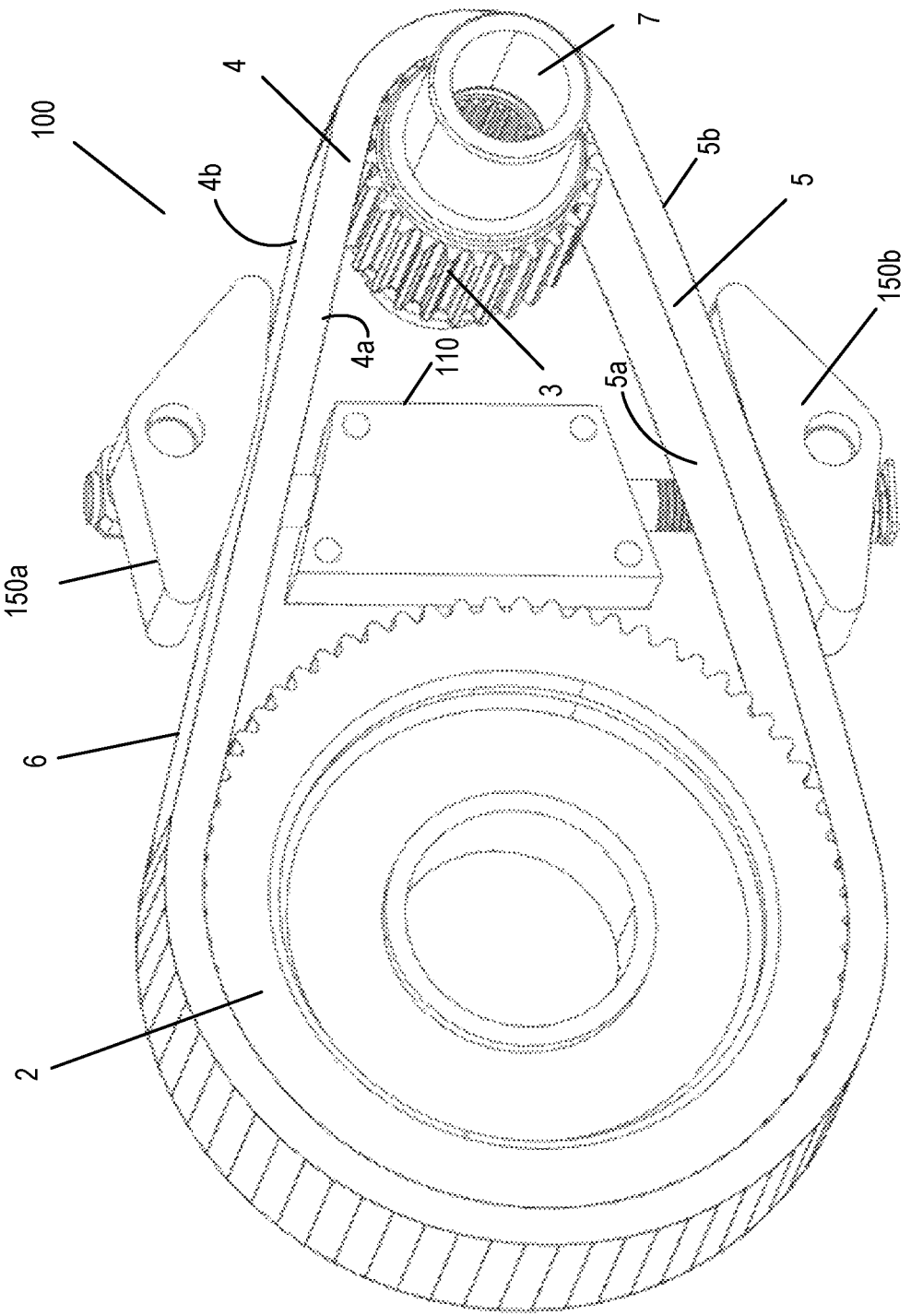
FIG. 1 shows a first embodiment of a shuttling tensioner within a chain drive for controlling both the tight and slack strands of a chain drive.
Figure 2:
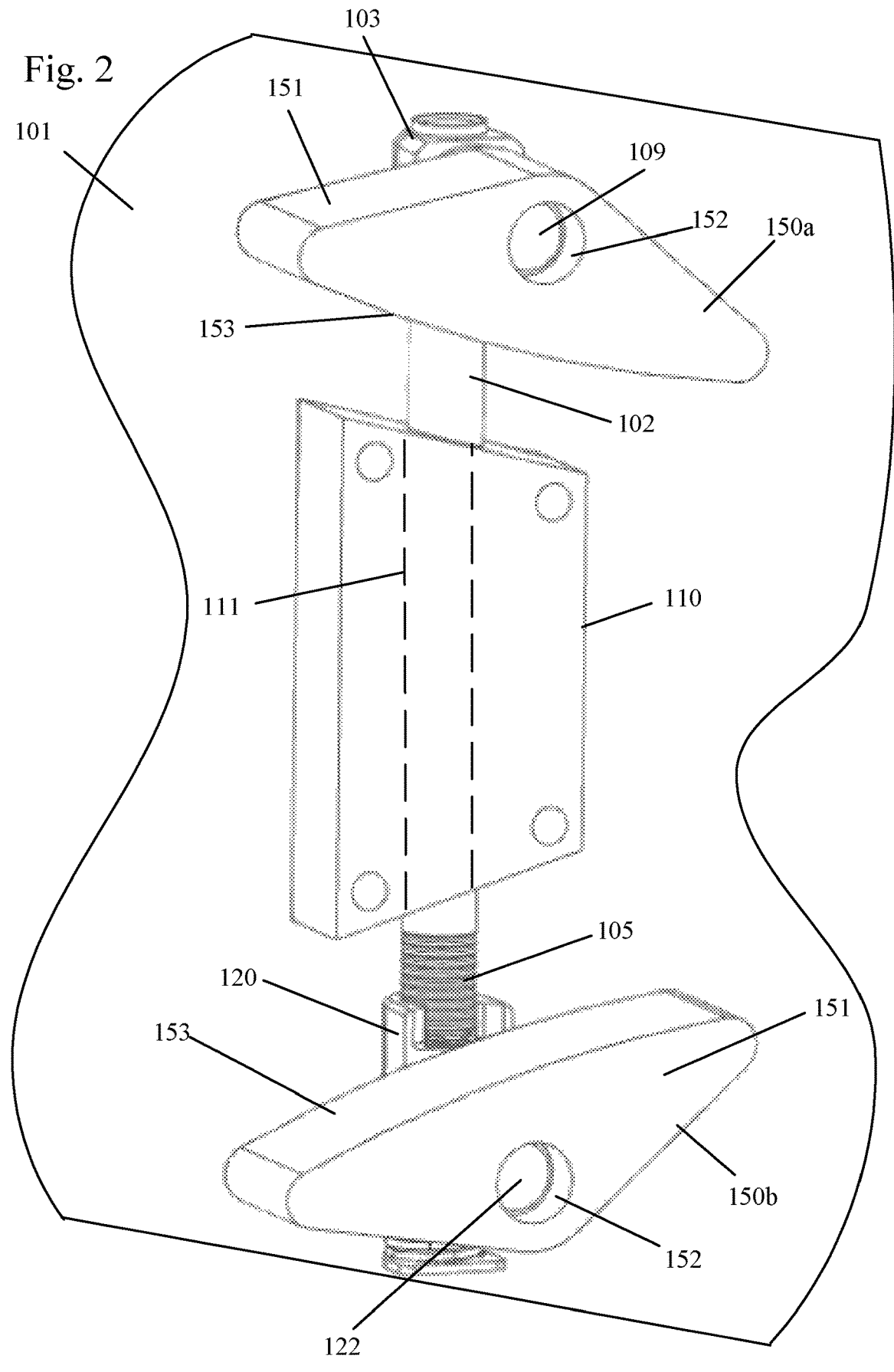
FIG. 2 shows the shuttling tensioner of FIG. 1.
Figure 3:
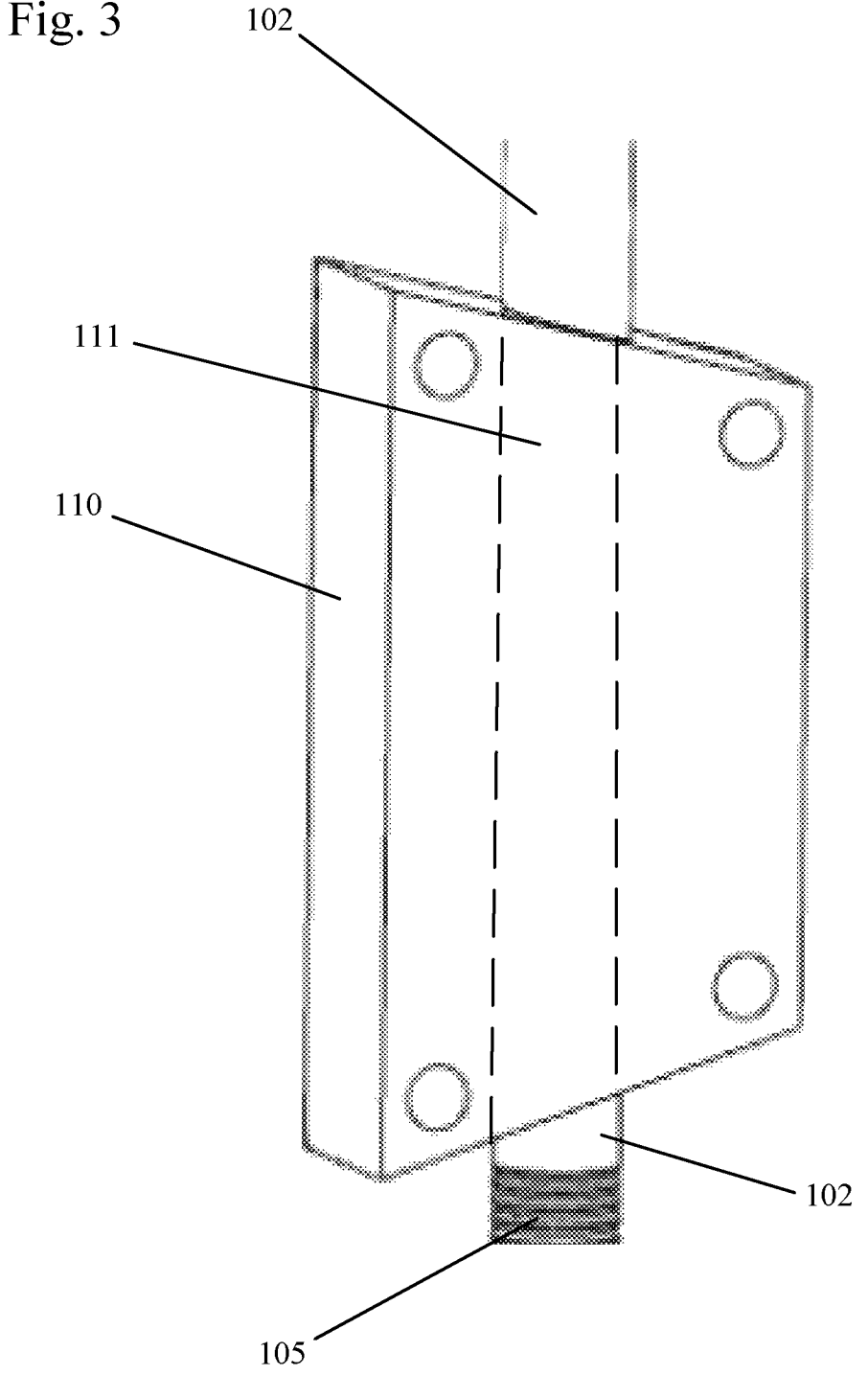
FIG. 3 shows the guide block of the shuttling tensioner of FIG. 1.
Figure 4A:
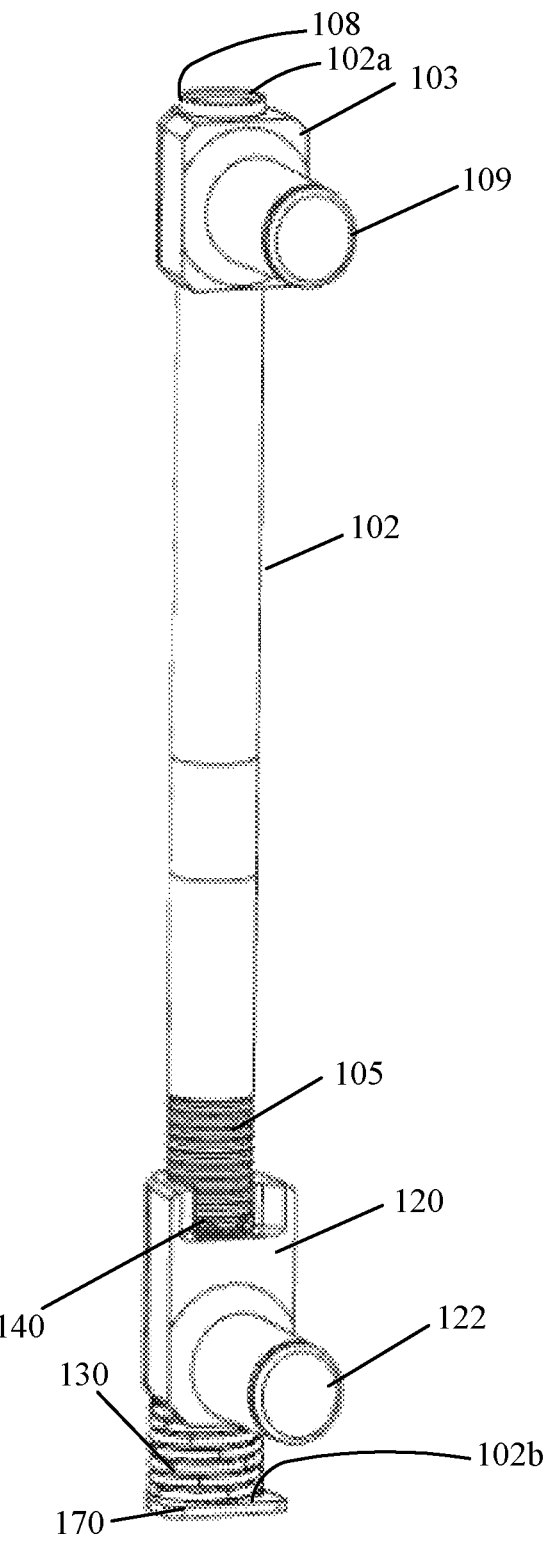
FIG. 4a shows the rod of the shuttling tensioner of FIG. 1.
Figure 4B:
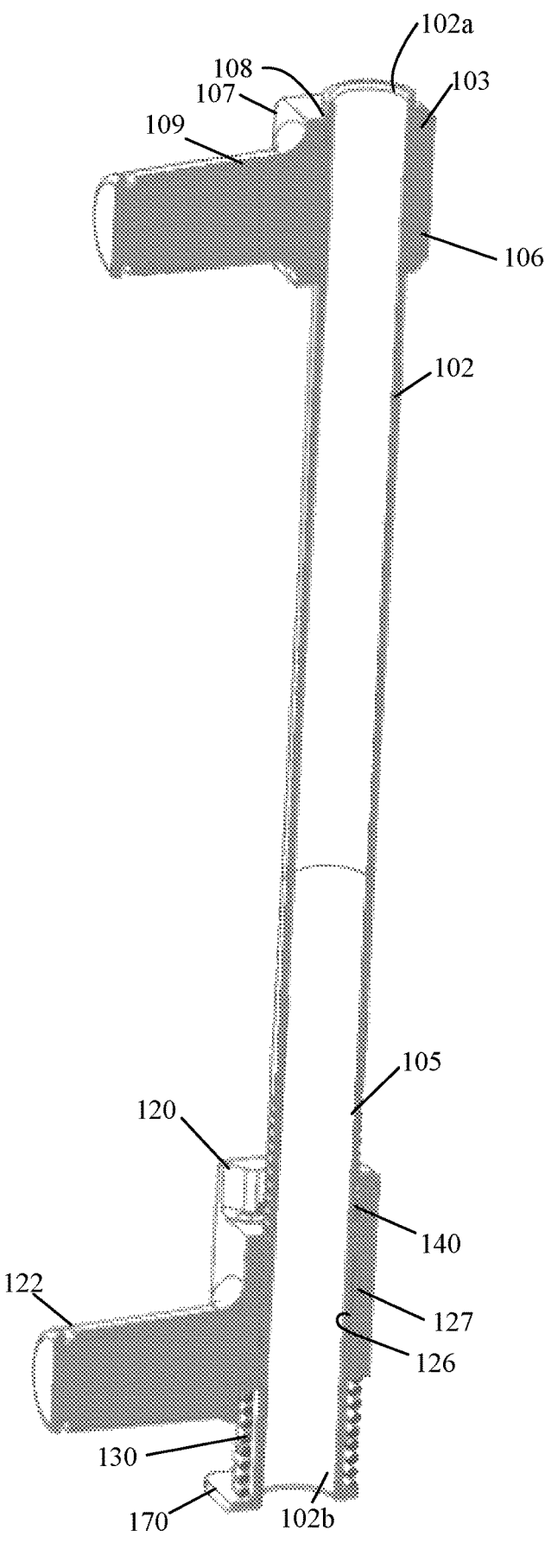
Figure 5A:
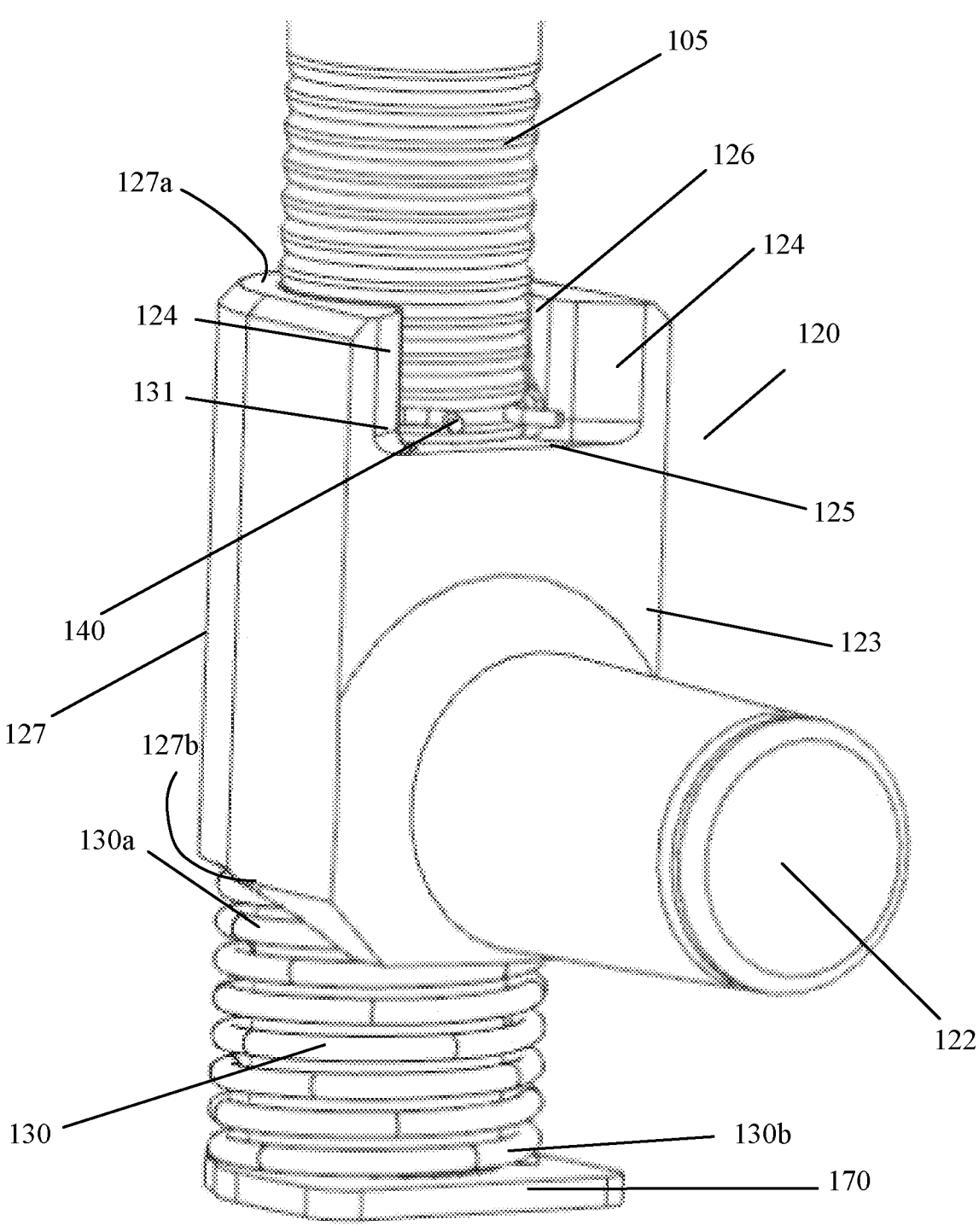
FIG. 5a shows the ratchet and springs of the shuttling tensioner of FIG. 1.
Figure 5B:
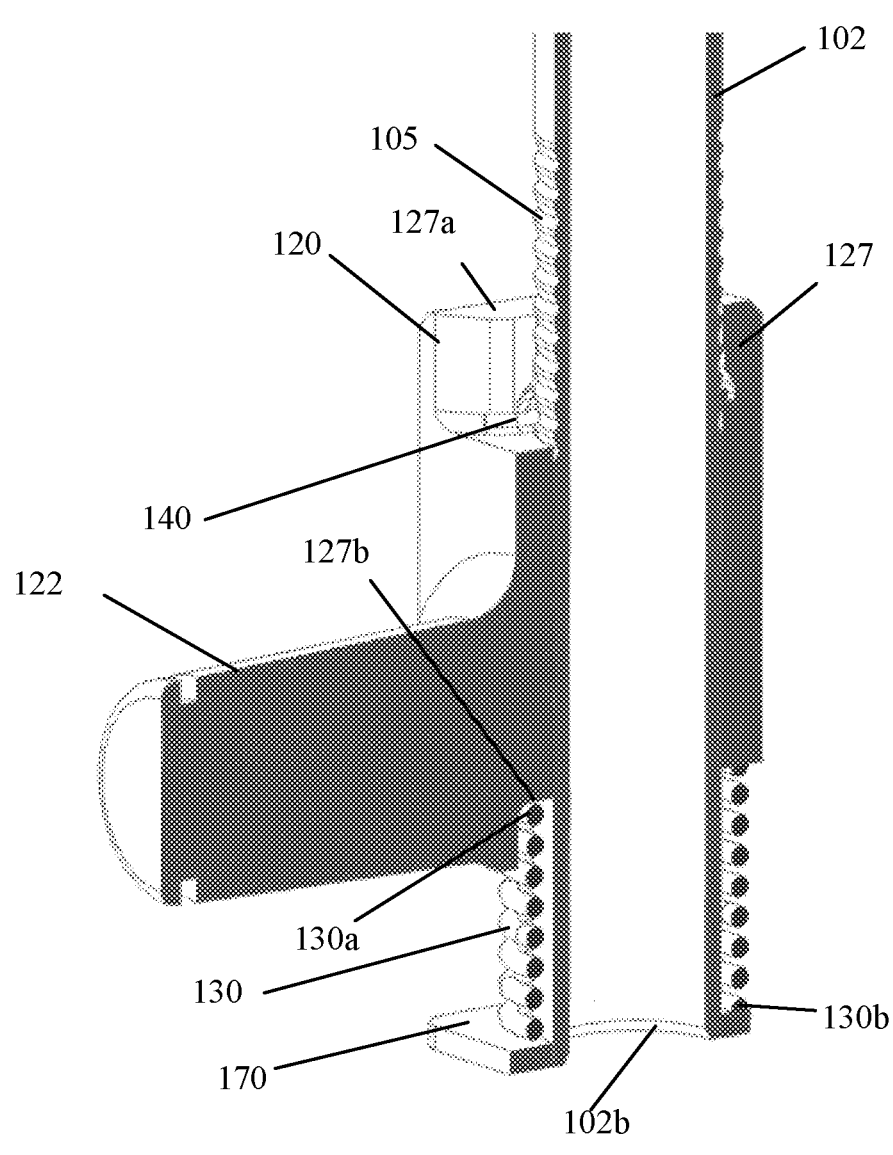

FIGS. 1-7, 11 and 12 show a shuttling mechanical tensioner between two strands of a chain of a chain drive system in a drivetrain housing 101. The chain system has a driven sprocket 2 connected to a driving sprocket 3 mounted to an output shaft 7 via a chain 6. It is noted that while a chain is shown, the chain can be replaced with a belt. Between the driven sprocket 2 and the driving sprocket 3, the chain is divided into a first strand 4 and a second strand 5. The first strand 4 and the second strand 5 have an inside surface 4a, 5a between the two sprockets 2, 3 and an outside surface 4b, 5b outside of the two sprockets. As shown, the first strand 4 is the tight strand 4 and the second strand 5 is the slack strand. In order to maintain proper tension on the chain 6 as the chain wears, tension needs to be applied to at least the second strand 5 of the chain 6.

Figure 7:
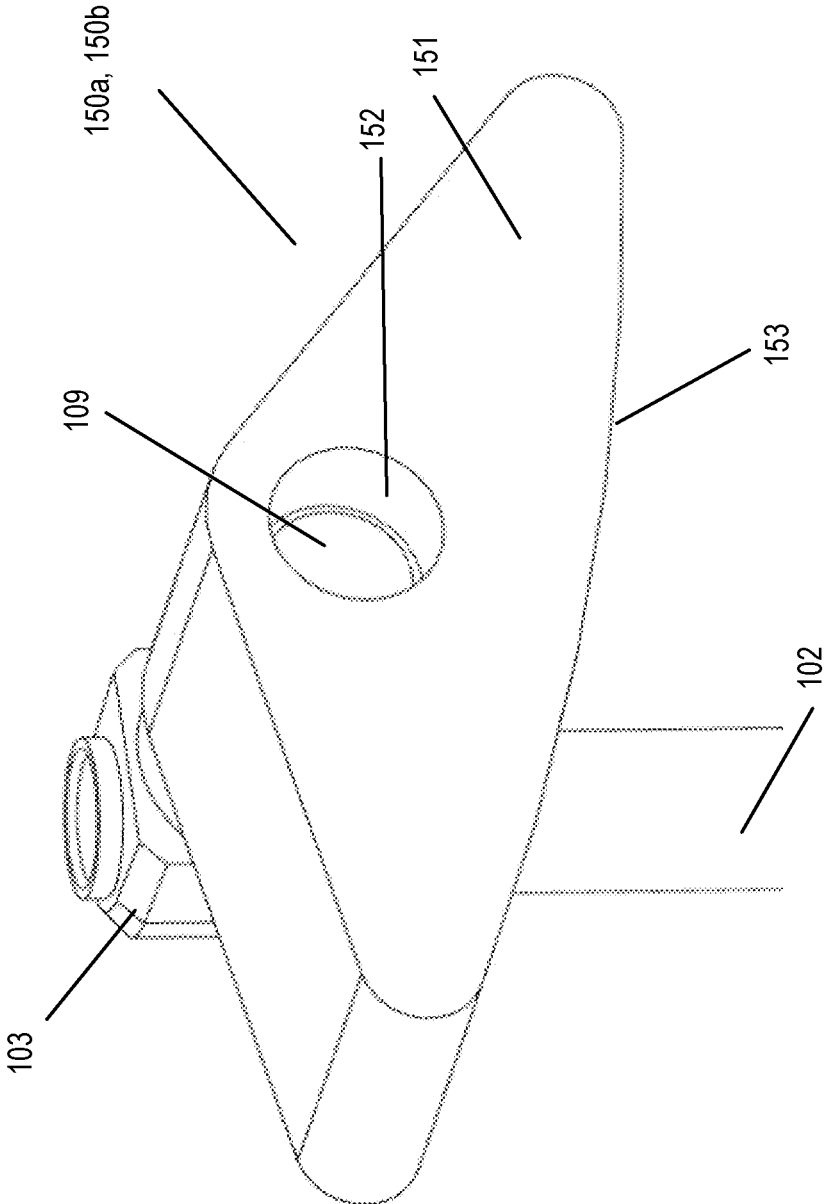
FIG. 7 shows a face of the shuttling tensioner of FIG. 1.

FIG. 1 shows the shuttling mechanical tensioner 100 mounted between the driven sprocket 2 and the driving sprocket 3, with a first tensioner face 150a interacting with the first strand 4 and a second tensioner face 150b interacting with the second strand 5. As shown in FIG. 7, each of the first tensioner face 150a and the second tensioner face 150b have a body 151 defining a bore 152 for coupling with the shuttling mechanical tensioner 100, and a chain sliding face 153. In this embodiment, the chain sliding face 153 of each of the first tensioner face 150a and the second tensioner face 150b engages with the chain 6, such that tension is applied on the outside surfaces 4b, 5b of the chain strands 4, 5 and that the first strand 4 and second strand 5 are biased towards each other.

Referring to FIGS. 4a-7, and 11-12 the shuttling mechanical tensioner 100 has a rod 102 of a length with a first end 102a and a second end 102b. Attached to the first end 102a is a fixed face support 103. Attached to the second end 102b of the rod 102 is cap 170. Between the cap 170 and the fixed face support 103 is a moveable face support 120. Between the moveable face support 120 and the fixed face support 103 is a guide block 110. The length of the rod 102 and thus the distance between the fixed face support 103 and the moveable face support 120 is determined by chain drive dimensions.

Figure 6A:
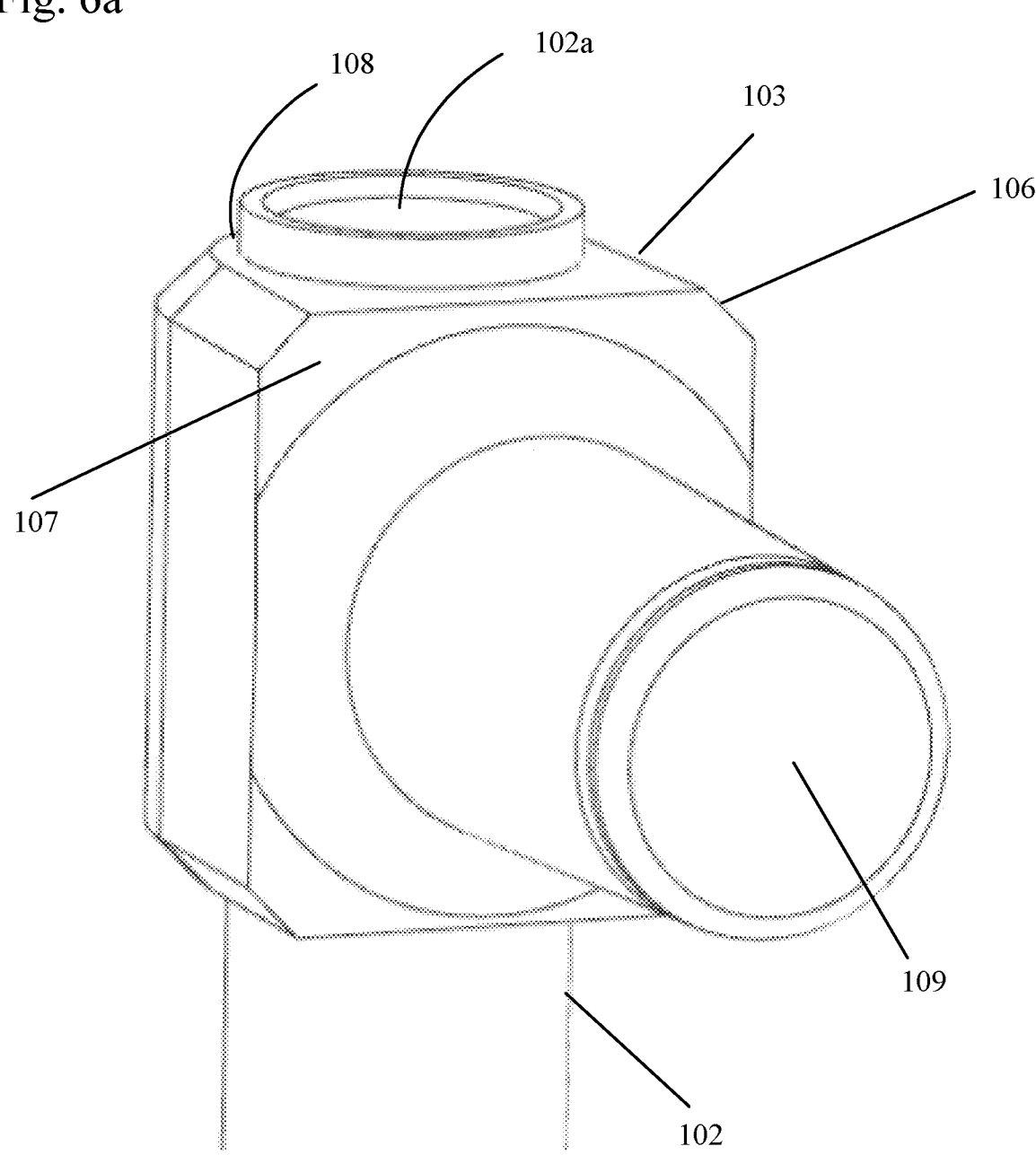
FIG. 6a shows a fixed face support of the shuttling tensioner of FIG. 1.
Figure 6B:
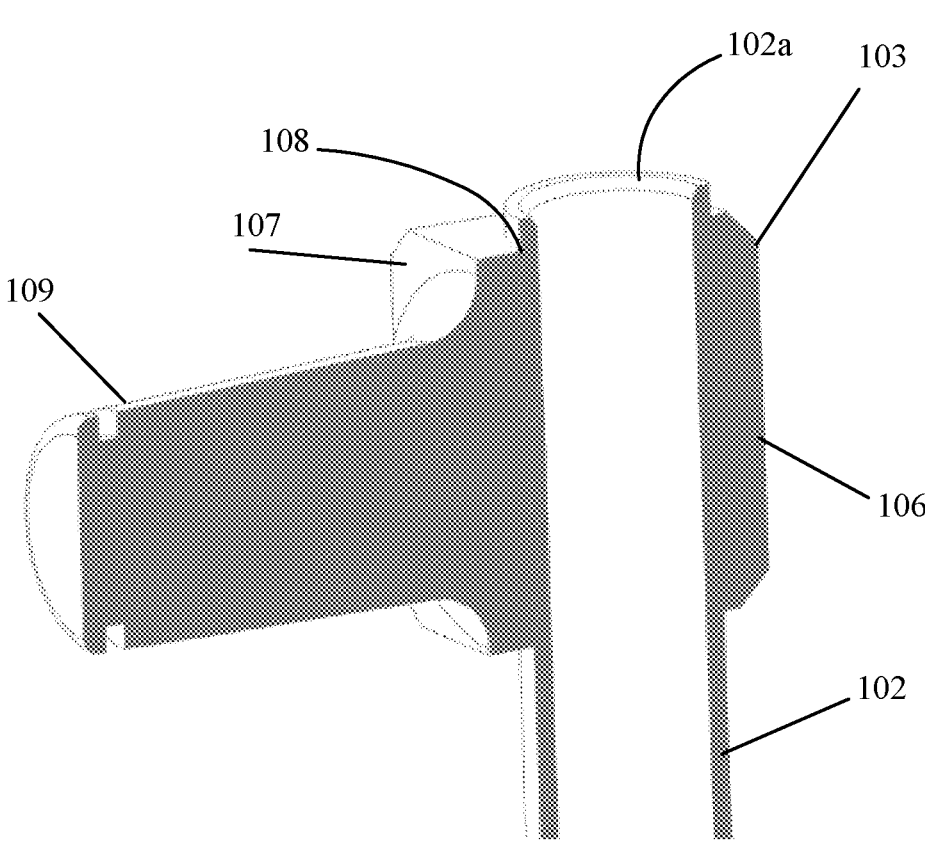

As shown in FIGS. 6a-6b, the fixed face support 103 has a body 106 defining an open-ended hole 108. Extending axially from a planar surface 107 of the body 106 and perpendicular to the open-ended hole 108 is a protrusion 109. The protrusion 109 is sized to receive a bore 152 of the first tensioner face 150a. The first tensioner face 150a can pivot about the protrusion 109 via bore 152 of the first tensioner face 150a. The first tensioner face 150a is secured to the protrusion 109. In one embodiment, the first tensioner face 150a is secured using an O-ring or rubber seal (not shown), although other methods of retaining the first tensioner face 150a can be used such as, but not limited to a retaining clip or flanged bolt. The fixed face support 103 is press fit or mechanically fastened to the rod 102. The first tensioner face 150a is preferably made of plastic, although other materials with high friction and high temperature resistance can also be used.

The outer circumference of the second end 102b of the rod 102 has a series of grooves 105 sized to interact with a clip 140. The clip 140 can be a ratchet clip, O-ring, c-clip, or any other clip that engage with the series of grooves 105 and allow for unrestricted movement in a first direction and restricted movement in a second, opposite direction. The grooves 105 extend a length along the rod 102. The second end 102b of the rod 102 receives a cap 170. Engaged with the grooves 105 between the cap 170 and the guide block 110 is a moveable face support 120. The grooves 105 are shaped such that the grooves 105 form teeth that are uniform and asymmetrical, with each tooth or groove shaped to have a moderate slope on one edge and a much steeper slope on the other edge.

Referring to FIGS. 5a-5b, 11 and 12, the moveable face support 120 has a body 127 defining an open-ended hole 126 extending from the first end 127a to the second end 127b. Extending axially from a planar surface 123 of the body 127 and perpendicular to the open-ended hole 126 is a protrusion 122. The protrusion 122 is sized to receive a bore 152 of the second tensioner face 150b. The second tensioner face 150b can pivot about the protrusion 122 via bore 152 of the second tensioner face 150b. The second tensioner face 150b is secured to the protrusion 122 with an O-ring or rubber seal (not shown). The second tensioner face 150b is preferably made of plastic, although other materials with low friction and high temperature resistance can also be used.

Along the planar surface 123 of the body 127 and adjacent to open-ended hole 126 is a cutout 131. The first cutout surface 125 of the cutout 131 extends from the planar surface 123 to the open-ended bore 126. Connected to and extending axially from either side of the first cutout surface 125 is a second cutout surface 124. In some embodiments, the second cutout surfaces 124 are angled relative to the planar surface 123. In other embodiments, the second cutout surfaces 124 are in the same plane as the planar surface 123. Some or all of the first and second cutout surfaces 124, 125 engage with a clip 140. In some embodiments, the second cutout surfaces 124 aid in preventing rotation of the clip 140 when engaged with the grooves 105. The moveable face support 120 and the clip 140 provide an anti-return mechanism that interfaces with the rod 102.

Between the moveable face support 120 and the cap 170 is a bias spring 130. The bias spring 130 surrounds the rod 102. A first end 130a of the bias spring 130 engages with a second end 127b of the moveable face support 120 and a second end 130b of the bias spring 130 engages the cap 170. The bias spring 130 biases the moveable face support 120 towards the first end 102a of the rod 102.

Between the moveable face support 120 and the fixed face support 103 is a guide block 110 which supports the shuttling mechanical tensioner 100 in the correct location in the chain drive system and can be fixed to drivetrain housing 101 of the chain drive system. The guide block 110 has a hole 111 for slidably receiving the rod 102. In one embodiment, along the length of the rod 102 between the moveable face support 120 and the fixed face support 103 is an anti-rotation feature to prevent the rod from rotating within the guide block 110. The anti-rotation can be, but is not limited to, a keyway or keyseat formed on the outer circumference of the rod 102 and interacts with associated key.

As slack in the chain 6 increases, in either strand 4, 5, tension is applied by the shuttling mechanical tensioner 100 to the chain strands 4, 5 via the first tensioner face 150a and the second tensioner face 150b. Bias spring 130 biases the moveable face support 120 and the chain sliding face 153 of the second tensioner face 150b into account with the strand 5 of the chain 6 to decrease the distance between the first tensioner face 150a and the second tensioner face 150b. The moveable face support 120 moves toward the fixed face support 103 by the bias spring 130 and engagement of the clip 140 with the series of grooves 105 on the rod 102. The moveable face support 120 can move towards the fixed face support 103 but is prevented from moving away from the fixed face support 103 by the interaction of the series of grooves 105 on the rod 102 and the clip 140.

Figure 8:
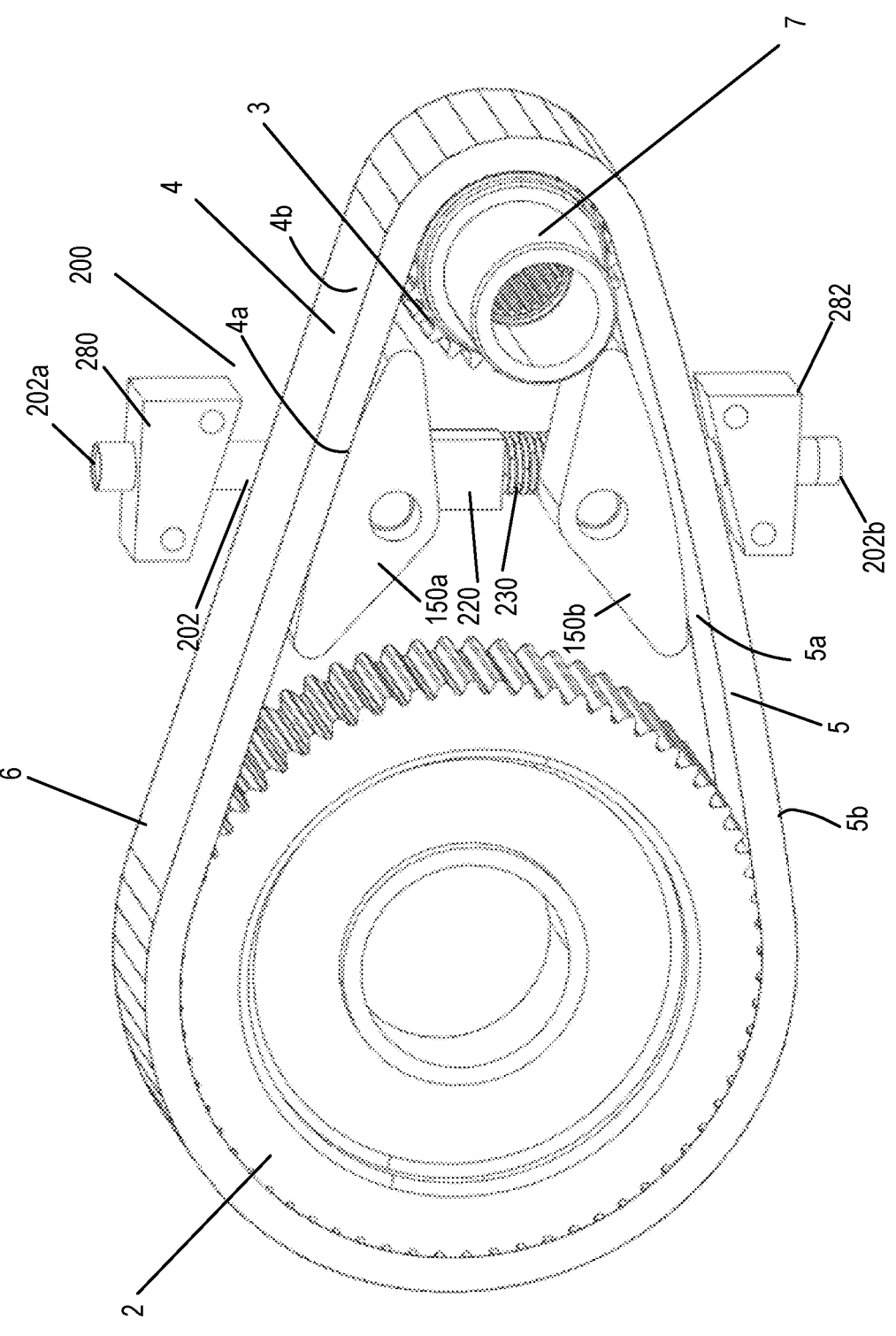
FIG. 8 shows a second embodiment of a shuttling tensioner within a chain drive for controlling both the tight and slack strands of a chain drive.
Figure 9:
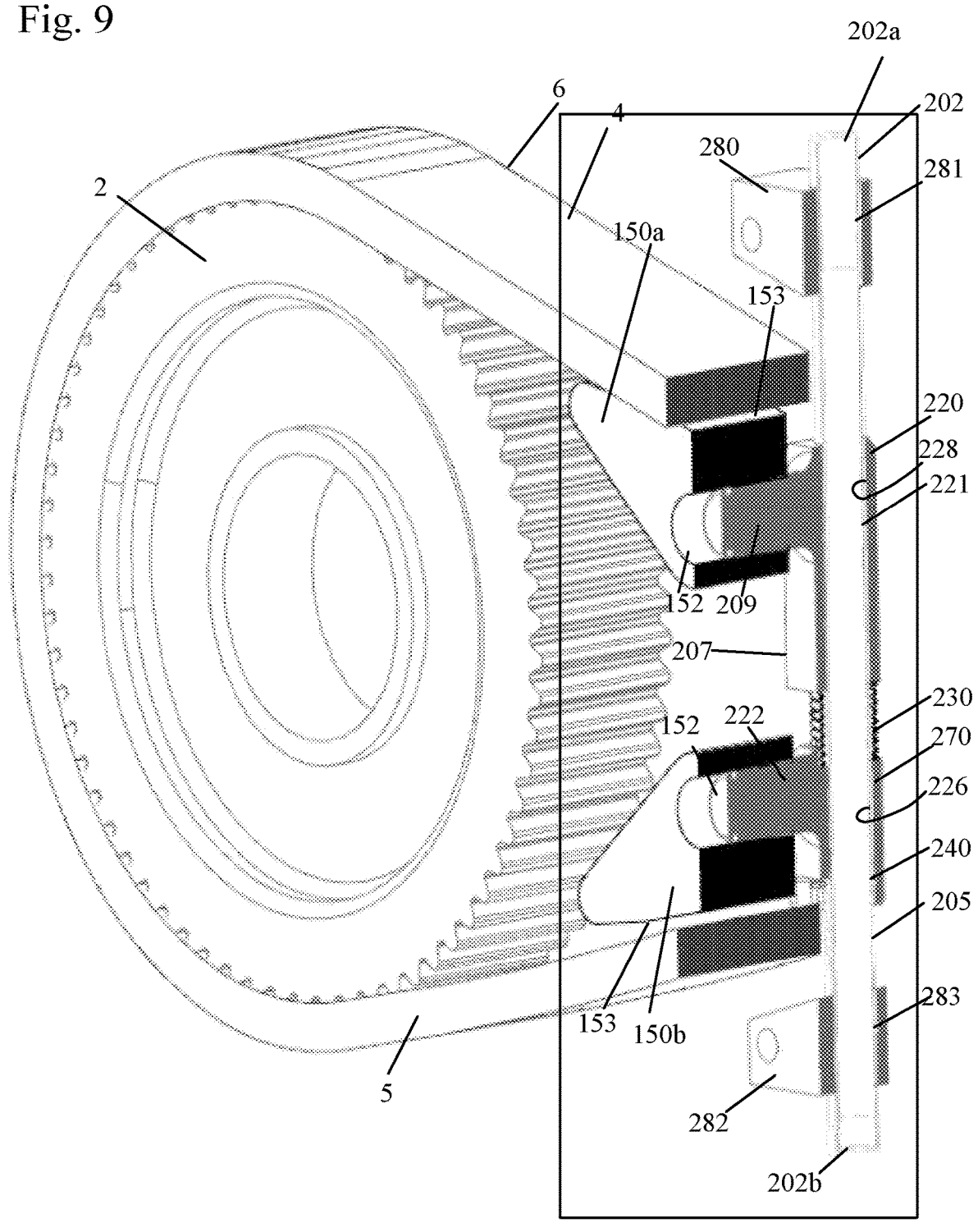
FIG. 9 is a sectional view of the shuttling tensioner of the second embodiment with the chain drive.
Figure 10:
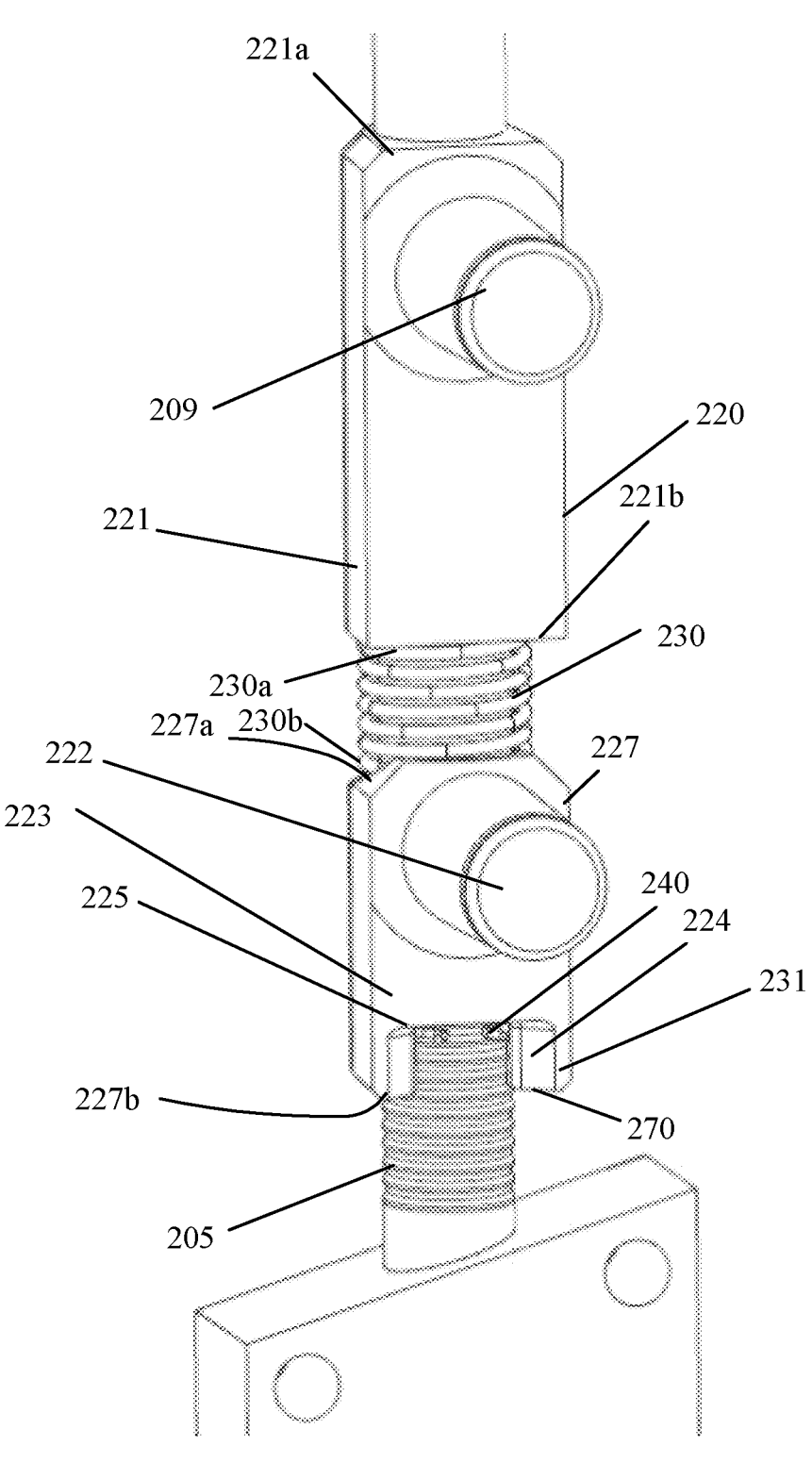
FIG. 10 shows the shuttling tensioner of FIG. 8.
Figure 11:
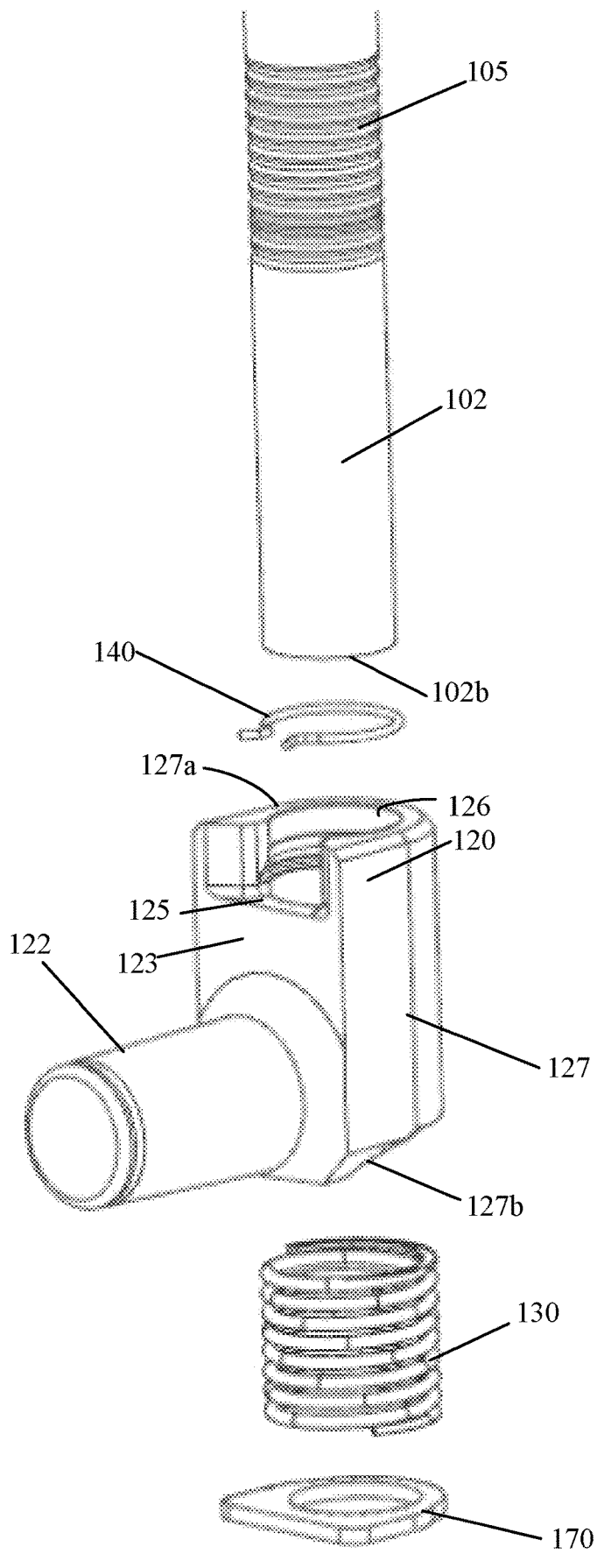
FIG. 11 shows an exploded view of FIG. 5b.
Figure 12:
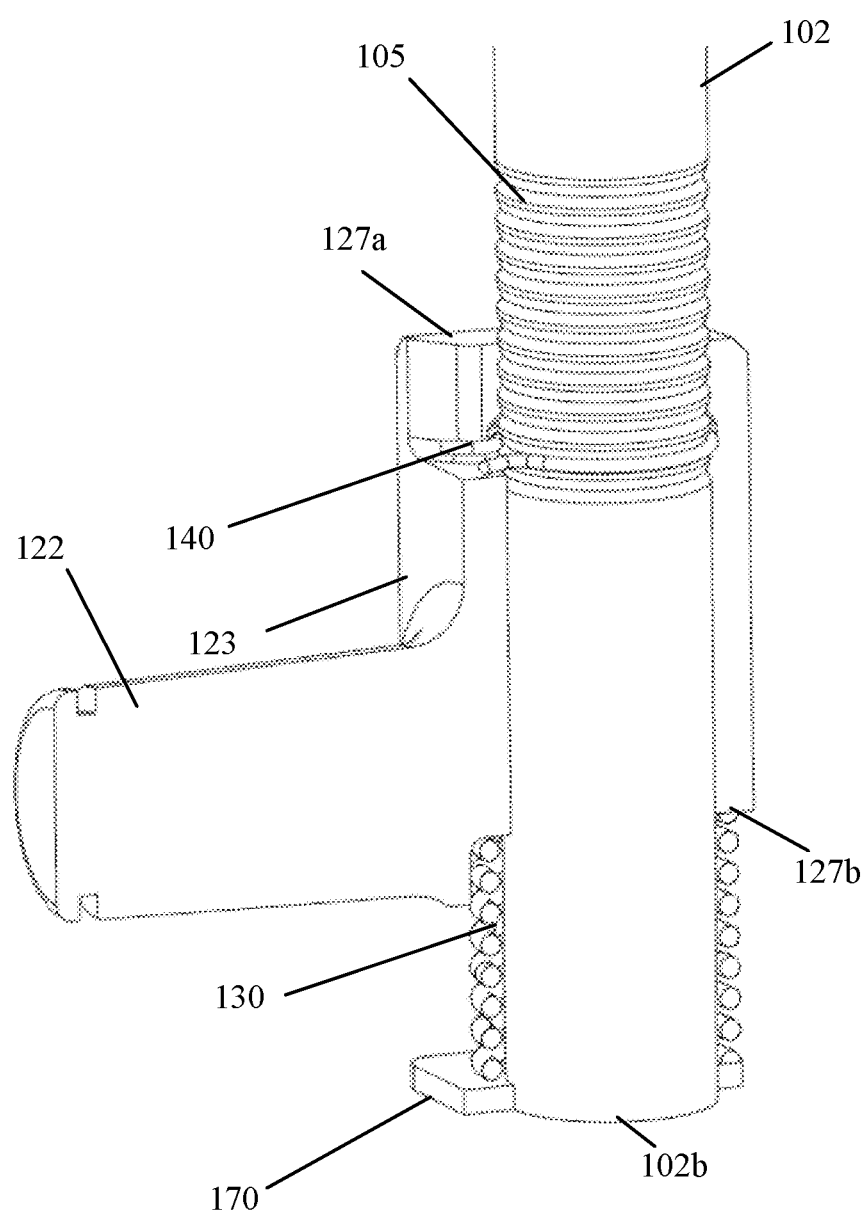

FIGS. 8-10 show a shuttling mechanical tensioner of another embodiment between two strands of a chain of a chain drive system in a drivetrain housing. It is noted that in this embodiment, the entire assembly is grounded by one or more fixed pieces that allow the tensioning portion to shuttle back and forth for situations where the tight and slack strands of the chain swap or alternate, such as a "regen" event in an EV drive.

The chain system has a driven sprocket 2 connected to a driving sprocket 3 mounted to an output shaft 7 via a chain 6. It is noted that while a chain is shown, the chain can be replaced with a belt. Between the driven sprocket 2 and the driving sprocket 3, the chain is divided into a first strand 4 and a second strand 5. The first strand 4 and the second strand 5 have an inside surface 4a, 5a between the two sprockets 2, 3 and an outside surface 4b, 5b outside of the two sprockets. As shown, the first strand 4 is the tight strand 4 and the second strand 5 is the slack strand. In order to maintain proper tension on the chain 6 as the chain wears, tension needs to be applied to at least the second strand 5 of the chain 6.

The shuttling mechanical tensioner 200 mounted between the driven sprocket 2 and the driving sprocket 3, with a first tensioner face 150a interacting with the inside surface 4a of the first strand 4 and a second tensioner face 150b interacting with the inside surface 5a of the second strand 5. As shown in FIG. 7, each of the first tensioner face 150a and the second tensioner face 150b have a body 151 defining a bore 152 for coupling with the shuttling mechanical tensioner 200, and a chain sliding face 153. In this embodiment, the chain sliding face 153 of each of the first tensioner face 150a and the second tensioner face 150b engages with the chain 6, such that tension is applied such that the first strand 4 and the second strand 5 are biased away from each other.

The shuttling mechanical tensioner 200 has a rod 202 of a length with a first end 202a and a second end 202b. Attached to the first end 202a is a first fixed piece 280, fixed to the drivetrain housing 201 and defines a bore 281 for receiving the rod 202. Attached to the second end 202b is a second fixed piece 282, fixed to the drivetrain housing 201 and defining a bore 283 to receive the rod 202. Proximate to the first fixed piece 280 and along the rod 202 is a first moveable face support 220. Proximate to second fixed piece 282 and along the rod 202 is a second moveable face support 270. Between the first moveable face support 220 and the second moveable face support 270 is a bias spring 230. Between the second fixed piece 282 and the second moveable face support 270, the rod has a series of grooves 205 that interact with a clip 240. The length of the rod 202 is determined by chain drive dimensions.

The first moveable face support 220 has a body 221 has a first end 221a and a second end 221b, with the body 221 defining an open-ended hole 228 extending between the first end 221a and the second end 221b. Extending axially from a planar surface 207 of the body 221 and perpendicular to the open-ended hole 228 is a protrusion 209. The protrusion 209 is sized to receive a bore 152 of the first tensioner face 150a. The first tensioner face 150a can pivot about the protrusion 109 via bore 152 of the first tensioner face 150a. The first tensioner face 150a is secured to the protrusion 109. In one embodiment, the first tensioner face 150a is secured using an O-ring or rubber seal (not shown), although other methods of retaining the first tensioner face 150a can be used such as, but not limited to a retaining clip or flanged bolt. The first moveable face support 220 is moveable or slidable about the rod 202. The movement of the first moveable face support 220 along the rod is limited by the bias spring 230 discussed in further detail below. The first tensioner face 150a is preferably made of plastic, although other materials with low friction and high temperature resistance can also be used.

The outer circumference of the second end 202b of the rod 202 has a series of grooves 205 sized to interact with a clip 240. The clip 240 can be a ratchet clip, O-ring, c-clip, or any other clip that engage with the series of grooves 205 and allow for unrestricted movement in a first direction and restricted movement in a second, opposite direction. The grooves 205 extend a length along the rod 202. Engaged with the grooves 205 is a second moveable face support 270. The grooves 205 are shaped such that the grooves 205 form teeth that are uniform and asymmetrical, with each tooth or groove shaped to have a moderate slope on one edge and a much steeper slope on the other edge.

The second moveable face support 270 has a body 227 defining an open-ended hole 226 extending from the first end 227a to the second end 227b. Extending axially from a planar surface 223 of the body 227 and perpendicular to the open-ended hole 226 is a protrusion 222. The protrusion 222 is sized to receive a bore 152 of the second tensioner face 150b. The second tensioner face 150b can pivot about the protrusion 222 via bore 152 of the second tensioner face 150b. The second tensioner face 150b is secured to the protrusion 222. In one embodiment, the second tensioner face 150b is secured to the protrusion 109 with an O-ring or rubber seal (not shown), although other methods of retaining the second tensioner face 150b can be used such as, but not limited to a retaining clip or flanged bolt. The second tensioner face 150b is preferably made of plastic, although other materials with high friction and high temperature resistance can also be used.

Along the planar surface 223 of the body 227 proximal to the second end 227b of the body 227 is a cutout 231. The first cutout surface 225 of the cutout 231 extends from the planar surface 223 to the open-ended bore 226. Connected to and extending axially from either side of the first cutout surface 225 is a second cutout surface 224. In some embodiments, the second cutout surfaces 224 are angled relative to the planar surface 223. In other embodiments, the second cutout surfaces 224 are in the same plane as the planar surface 223. Some or all of the first and second cutout surfaces 224, 225 engage with a clip 240. In some embodiments, the second cutout surfaces 224 aid in preventing rotation of the clip 240 when engaged with the grooves 205. The second moveable face support 270 and the clip 240 provide an anti-return mechanism that interfaces with the rod 202.

Between the first moveable face support 220 and the second moveable face support 270 is a bias spring 230. The bias spring 230 surrounds the rod 202. A first end 230a of the bias spring 230 engages with the second end 221b of the first moveable face support 220 and a second end 230b of the bias spring 230 engages the first end 227a of the second moveable face support 270.

The bias spring 230 connects the first moveable face support 220 to the second moveable face support 270 to force the first moveable face support 220 and the second moveable face support 270 away from one another to ensure tension is applied to both strands 4, 5 of the chain 6.

As slack in the chain 6 increases, in either strand 4, 5, tension is applied by the shuttling mechanical tensioner 200 to the chain strands 4, 5 via the first tensioner face 150a and the second tensioner face 150b. Bias spring 230 biases the first moveable face support 220 and the chain sliding face 153 of the first tensioner face 150a into strand 4 of the chain. Bias spring 230 also biases the second moveable face support 270 and the chain sliding face 153 of the second tensioner face 150b towards strand 5 of the chain 6. The distance between the first moveable face support 220 and the second moveable face support 270 is maintained by the engagement of the clip 240 with the grooves 205 on the outer circumference of the rod 202 and the cutout 231 of the second moveable face support 270, which allows movement of the second moveable face support 270 along the length of the rod 202 towards the first moveable face support 220.

The shuttling movement of the first moveable face support 220 allows the high tension due to applied torque to switch between the first strand 4 and the second strand 5 in chain 6 while maintaining contact of the first and second tensioner faces 150a, 150b to maintain contact and strand control of the first strand 4 and the second strand 5, respectively. When tension is applied to the first strand 4, force applied to second tensioner face 150b is transmitted to body 221, through bias spring 230, to second moveable face support 270 and second tensioner face 150b. As chain sliding face 153 is in contact with inside surface 5a, a small tension is therefore applied to the second strand 5 when no torque is being transmitted through the second strand 5, resulting in motion control of second strand 5. As the torque direction is reversed, such as in regen mode of an electric vehicle (EV), the tension in the first strand 4 is removed and applied to the second strand 5. The force from the contact between inside surface 5a and the chain sliding face 153 is then transmitted through the second moveable face support 270, through bias spring 230, and into the first moveable face support 220 to apply a small force to the first tensioner face 150a to allow motion control of the first strand 4 through contact between the surface 4a and the chain sliding face 153.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner for a chain housed in a chain drive housing comprising:
   a rod having a first end and a second end separated by a length and a series of grooves proximate to the second end;
   a first face support proximal to and fixed to a first end of the rod comprising a body defining a first face support hole for receiving the rod and a first face support protrusion extending axially from the body of the first face support, perpendicular to the first face support hole;
   a first tensioner face pivotably mounted to the first face support protrusion applying tension to a first strand of the chain;
   a second face support proximal to the second end of the rod having a body defining a second face support hole for receiving the rod, a cutout on a planar surface of the body adjacent the second face support hole, and a second face support protrusion extending axially from the body of the second face support, the cutout being adjacent to the series of grooves on the rod, wherein the second face support is moveable along the rod;
   a second tensioner face pivotably mounted to the second face support protrusion applying tension to a second strand of the chain;
   a clip for engaging the series of grooves of the rod within the second face support hole and the cutout of the second face support, allowing for movement of the rod in a first direction and preventing movement of the rod in a second direction, opposite the first direction; and
   a bias spring biasing the second face support towards the first face support;
   wherein as slack in the chain increases, tension is applied to the first strand of the chain via the first tensioner face mounted to the first face support and tension is applied to the second strand of the chain by the second tensioner face mounted to the second face support moveably biased into contact by the bias spring and held in contact with the second strand of the chain by engagement of the clip with the series of grooves on the rod and the cutout of the body of the second face support.

2. The tensioner of claim 1, further comprising a fixed block mounted to the rod between the first face support and the second face support and fixed to the chain drive housing between the first face support and the second face support.

3. The tensioner of claim 2, further comprising an anti-rotation device mounted between the rod and the fixed block.

4. The tensioner of claim 1, further comprising a cap mounted to the second end of the rod, wherein the bias spring is between the cap and the second face support.

5. The tensioner of claim 1, wherein a first tensioner face support and a second tensioner face support each comprises a body defining a hole and a chain sliding face.

6. The tensioner of claim 5, wherein the chain sliding face of the first tensioner face support tensions an outside surface of the first strand of the chain and the chain sliding face of the second tensioner face support tensions an outside surface of the second strand of the chain.

7. A tensioner for a chain housed in a chain drive housing comprising:
   a rod having a first end and a second end separated by a length and a series of grooves proximate to the second end;
   a first fixed piece mounted to the first end of the rod;
   a second fixed piece mounted to the second end of the rod;
   a first face support proximal to the first end of the rod and movable about the rod comprising a body defining a first face support hole for receiving the rod and a first face support protrusion extending axially from the body of the first face support, perpendicular to the first face support hole;
   a first tensioner face pivotably mounted to the first face support protrusion applying tension to a first strand of the chain;
   a second face support proximal to the second end of the rod having a body defining a second face support hole for receiving the rod, a cutout on a planar surface of the body adjacent the second face support hole, and a second face support protrusion extending axially from the body of the second face support, the cutout being adjacent to the series of grooves on the rod, wherein the second face support is moveable along the rod;
   a second tensioner face pivotably mounted to the second face support protrusion applying tension to the second strand of the chain;
   a clip for engaging the series of grooves of the rod within the second face support hole and the cutout of the second face support, allowing for movement of the rod in a first direction and preventing movement of the rod in a second direction, opposite the first direction; and
   a bias spring between the first moveable support and the second moveable support face;

wherein as slack in the chain increases, tension is applied to the first strand of the chain via the first tensioner face mounted to the first face support biased into contact by the bias spring and tension is applied to the second strand of the chain by the second tensioner face mounted to the second face support moveably biased into contact by the bias spring and held in contact with second strand of the chain by engagement of the clip with the series of grooves on the rod and the cutout of the body of the second face support.

8. The tensioner of claim 7, further comprising a first fixed piece mounted the first end of the rod and fixed to the chain drive housing and a second fixed piece mounted to the second end of the rod and fixed to the chain drive housing.

9. The tensioner of claim 7, wherein a first tensioner support and the second tensioner support face each comprises a body defining a hole and a chain sliding face.

10. The tensioner of claim 9, wherein the chain sliding face of the first tensioner support tensions an inside surface of the first strand of the chain and the chain sliding face of the second tensioner support face tensions an inside surface of the second strand of the chain.

\* \* \* \* \*